May 16, 1944.   J. H. JACOBS   2,348,908
METHOD OF MAKING MULTIPLE TOOL HOLDERS
Filed Aug. 10, 1942
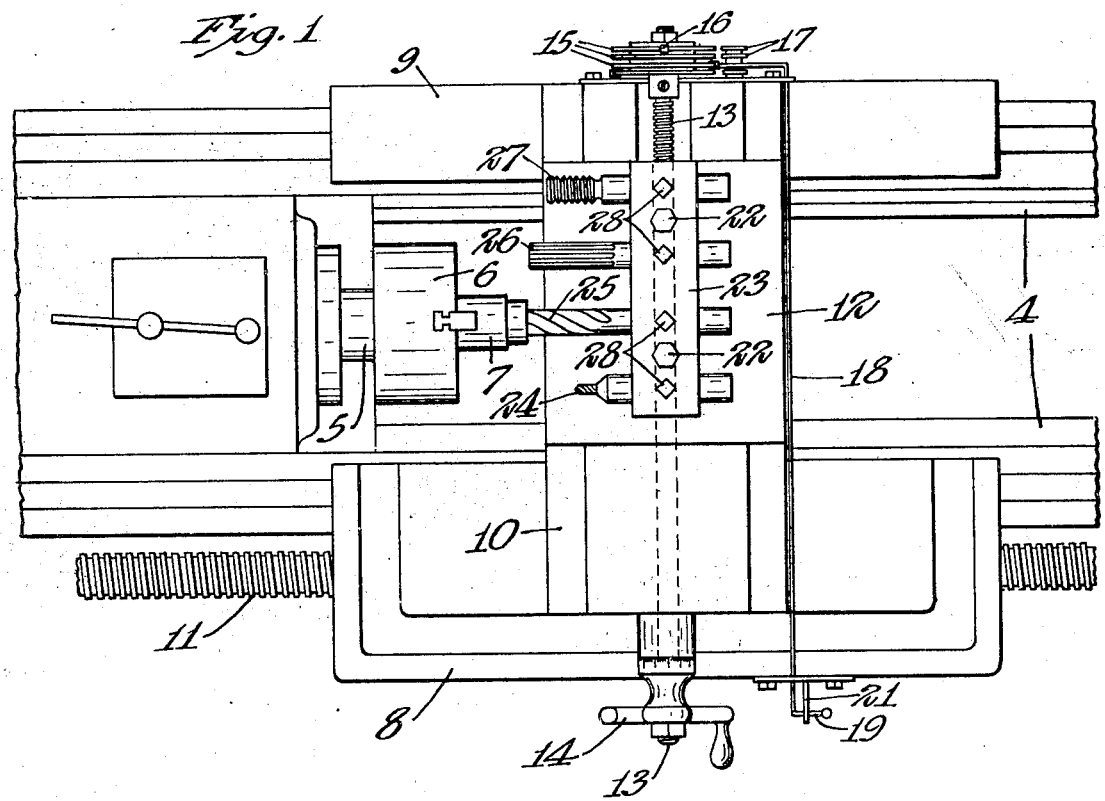
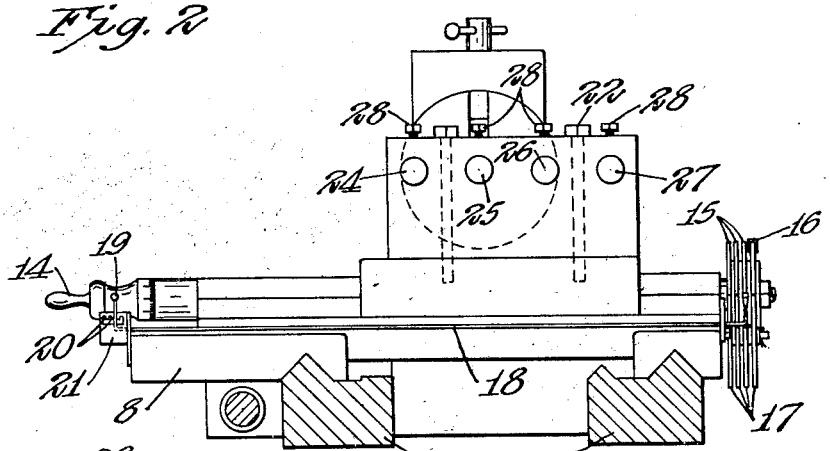
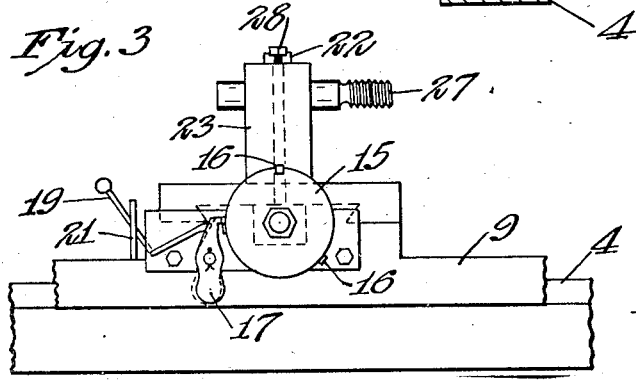
Inventor
Joseph H. Jacobs
By Williamson & Williamson
Attorneys Patented May 16, 1944

2,348,908

UNITED STATES PATENT OFFICE 2,348,908

METHOD OF MAKING MULTIPLE TOOLHOLDERS

Joseph H. Jacobs, Minneapolis, Minn.

Application August 10, 1942, Serial No. 454,283

2 Claims. (Cl. 29—54)

This invention relates to an improvement in lathe attachments and, more particularly, to means which are designed to serve as a substitute for the well known turret head in use today.

Conventional turret heads for lathes are multiple tool holders in which the several tools extend from the head in different directions and as each tool is needed for a cutting operation, the head is swung to bring that particular tool into proper operative position. Each time a succeeding tool is brought into position, the head must be loosened and swung and then tightened before the cutting operation can be resumed. Furthermore, as is well known in the art, turret heads are rather expensive pieces of equipment which must generally be built for and precisely fitted to the lathe when the machine is first built.

It is an object of my invention to provide a device for use with lathes which constitutes a multiple tool holder which is extremely simple in construction as compared to a turret head and in which the adjustment from one tool to the other for various cutting operations can be made speedily and at the same time extremely accurately.

Another object of the invention is to provide a feed control, principally a cross feed control, which insures extremely accurate repetition of cutting operations in combination with a tool holder which is brought into cutting position in direct relationship to the accurate resetting of the cross feed.

A further object of the invention is to provide means for initially forming a multiple tool holder in such a manner that the tools will be positioned in an exact predetermined relationship to the work holder so that the initial, as well as succeeding cutting operations, are accurately performed.

Still another object of the invention is the provision of a method of forming a multiple tool holder with the apparatus described above.

These and other objects of the invention will more fully appear from the following description made in connection with the accompanying drawing wherein the same reference characters refer to the same parts in the various views, and, in which:

Fig. 1 is a plan view of a part of the lathe with my improved device mounted on the cross feed;

Fig. 2 is an end elevation; and

Fig. 3 is a rear elevation of the cross feed and its control mechanism.

In the drawing there is shown a pair of longitudinal bed rails 4 between which is supported a power-driven spindle 5 which carries a work holder 6 which is shown supporting a piece of work 7. Longitudinally slidable on the bed members 4 is a front carriage member 8 and a rear carriage member 9. The carriages 8 and 9 are connected by a cross feed bed 10, and the two carriages 8 and 9 are propelled longitudinally of the bed members 4 by means of a screw 11 in a conventional manner. The details of the screw action of the carriages 8 and 9 are not shown, since they are well understood in the art.

Mounted on the cross feed bed 10 is a cross feed plate 12 which can be moved transversely of the bed members 4 by means of a cross feed screw 13 actuated by a hand wheel 14 as is also well understood by those skilled in the art.

On the rear end of the cross feed screw 13 is mounted a series of discs 15 which rotate with the cross feed screw 13, and said discs 15 carry a series of stops 16, as best shown in Fig. 3. Pivotally supported adjacent the edges of the discs 15 is a series of dogs 17 which can be swung into or out of the path of movement of the stops 16 when the cross feed screw 13 and discs 15 are rotated. The dogs 17 normally hang with their stop-engaging ends out of the path of movement of the stops 16, but they can be selectively moved into stop-engaging position by shifting of a control rod 18 which extends across the lathe bed members and terminates in an actuating handle 19. The control rod 18 is adapted to slide longitudinally to bring the end of said rod into alignment with any one of the stop-engaging dogs 17, and the rod can be twisted to push one of the dogs into stop-engaging position. The control rod 18 is held in the desired position by seating the handle portion 19 of the control rod in any of a series of notches 20 formed in a plate 21 secured to the front carriage 8.

It will be seen that when one of the dogs 17 has been set to engage one of the stops 16 on the discs 15, and the cross feed screw 13 is rotated, said screw 13 and the cross feed plate 12 must necessarily stop at an exact predetermined position, which position is controlled by the settings of the stops 16 on their supporting discs. As is brought out in my copending application S. N. 442,740, filed May 13, 1942, the cross feed control just described insures exact re-setting of the cross feed for producing a plurality of identical cuts and accuracy is also insured even though the remainder of the lathe, including the cross feed and its operating screw, may be worn and have a certain amount of play therein.

Mounted upon the cross feed plate 12 and rigidly secured thereto by suitable fastening means, such as bolts 22, is a tool holder 23. The tool holder 23 is shown supporting four different cutting tools 24, 25, 26 and 27, which are clamped in the tool holder by means of set screws 28. Thus the tools 24, 25, 26 and 27 are rigidly held by the tool holder on the cross feed and can be repeatedly and successively brought into cutting position relative to the work 7 because of the accurate resetting provided for by the cross feed control discs and their stops.

I have devised a method by which the tool holder can be formed so that the tool positions relative to the holder and the work are determined by the relative positions of the cross feed stops 16. A tool holder blank is first clamped to the cross feed in the manner described above, and the blank is moved to a first tool position determined by the cross feed stop 16, and a tool-receiving hole is cut in the holder by means of a drill supported by the work holder 6, the work 7, of course, having been removed from the work holder. When the first of the tool-receiving holes has been cut, the cross feed is actuated until another desired and predetermined cross feed stop position is arrived at and a succeeding tool-receiving hole is cut in the holder 23. After the desired number of tool-receiving holes have been formed in the tool holder 23, the tools are secured in the holder, as shown, and it is obvious that the positions of the tools in the holder, as well as the position of the tool holder itself, must necessarily be accurately arrived at and the desired several cuts on the work will be repeated accurately because the same series of stops 16 on the cross feed control are utilized in the operations on the work.

With a multiple tool holder such as described above in combination with a cross feed control, it will be seen that I have provided a device for use on lathes which not only serves as a simple and comparatively inexpensive substitute for a turret head, but permits the production of a number of identical pieces of work requiring several cutting operations and the re-setting of the cross feed and the re-locating of the tools is accomplished with considerably more speed than with a turret head which must be loosened, adjusted and tightened each time a different tool is brought into cutting position.

Not only is my improved device accurate and quickly shifted, but it can be operated by a relatively inexperienced mechanic, since the cross feed control eliminates any change of error in bringing a tool into cutting position.

One particular advantage of my invention is that it can be installed on any ordinary machine lathe at present in use. In the event of an urgent demand for a lathe having the characteristics of a turret head lathe, it is possible to quickly and cheaply make the conversion as described above.

It will be noted that with each revolution of the cross feed screw 13, the control discs 15 make a similar single revolution. However, the cross feed can be shifted a considerable distance by rotating the feed screw 13 a number of times, and the desired stop-engaging dog 17 can then be shifted into stop-engaging position. The mechanic need only know that the cross feed screw should be rotated a certain number of times before the desired dog 17 is shifted into position, the particular number of feed screw revolutions being easily determined before starting to cut a number of pieces of work.

It will, of course, be understood that various changes may be made in the form, details, arrangement and proportions of the various parts and particularly in the specific type of tool holder. It is further to be understood that the multiple tool holder can also be used with any type of cross feed control wherein the cross feed screw can be positively stopped at any one of a number of predetermined stop positions.

What is claimed is:

1. A method of forming and locating a tool holder for lathes having work holders and tool feed means movable relative to said work holders and wherein said tool feed means is provided with a feed control for positively stopping said feed means at variously pre-determined points, which includes, rigidly securing a tool holder blank to said feed means, moving said feed means to a point determined by said positive stop means, and forming a tool receiver in said tool holder with a forming tool positioned in said work holder, whereby a tool positioned in said tool receiver in said tool holder can be repeatedly stopped in an exact pre-determined position relative to said work holder.

2. A method of forming and locating a tool holder for a lathe having a work holder with a fixed axis of rotation and having tool feed means movable relative to said work holder and transversely of said rotational axis, which includes moving said tool holder transversely of said rotational axis of said work holder to a pre-determined position, and forming a tool receiver in said tool holder with a forming device mounted in said work holder.

JOSEPH H. JACOBS.